Patented Sept. 6, 1938

2,129,156

UNITED STATES PATENT OFFICE 2,129,156

COATING COMPOSITION

Elmer W. Trolander and William Courtney Wilson, Chicago, Ill., assignors to Pyroxylin Products, Inc., Chicago, Ill., a corporation of Illinois No Drawing. Application April 10, 1936, Serial No. 73,797

12 Claims. (Cl. 134—79)

The present invention relates to the manufacture of a composition of matter useful in plastics, films, filaments and coatings.

It has particular reference to a composition which can be used in contact with cellulose and other materials for permitting exposure of the same to temperatures normally destructive of the unprotected material, and to temperatures above those at which such material coated with nitrocellulose base material or other cellulose ester base material is destroyed along with the protecting ester. The composition itself is capable of being subjected to temperatures above the limiting exposure temperatures for cellulose ester base compositions, without deterioration or loss of its valuable properties, which limiting temperature is 175° C. when cellulose acetate is the cellulose ester. The composition is resistant to oils, greases, acids, ozone and water, at high and low temperatures. At these high and low temperatures the composition is also flexible, tough and elastic.

The composition is generally useful like nitrocellulose compositions, but far superior in many respects. Nitrocellulose of the soluble cotton type breaks down at about 120° C. to 140° C., liberating oxides of nitrogen, which are acidic in nature. Where such nitrocellulose or modified combinations of it are in contact with material like cotton, silk or like products affected by heat and/or acid materials, the breakdown of nitrocellulose hastens destruction of those materials on which it may have been used as a protecting agent. Cellulose acetate also breaks down liberating acetic acid at about 150° C. to 175° C., which likewise aids in destruction of cellulose and the like, as with nitrocellulose. Esters in general, being derived from acid present this difficulty for compositions at the more elevated temperatures.

It is therefore an object of the present invention to provide a composition having a cellulose derivative base which is more stable at the higher temperatures, which does not break-down into acid components, which can be modified to have valuable properties of flexibility, elasticity, resistance to oil, acids, ozone and other things, and which exhibits these same qualities at low and normal as well as at high temperatures.

Cellulose ethers are not subject to break-down to yield acid products, and are more stable than cellulose esters, especially at elevated temperatures. This is true of aliphatic cellulose ethers and of aromatic cellulose ethers. The various ethers in these groups have different properties which determine which one or what mixtures of them may be employed in this invention to meet desired conditions. For example, methyl cellulose is somewhat affected by water, and in general requires solvent containing some water. The aliphatic cellulose ethers having more than one carbon atom, such as ethyl, propyl, butyl, etc., are soluble in non-aqueous solvents and are resistant to water. Aromatic cellulose ethers such as benzyl cellulose soften or melt at higher temperatures at which the aliphatic ethers are solid. Therefore, aliphatic cellulose ethers having more than one carbon atom in the aliphatic radicle are the more practical ones. Of these ethyl cellulose is the preferred one since it is very suitable for both low and high temperatures.

The ethers alone are not suitable, since they lack the softness, flexibility, elasticity and resistance desired for the purposes of the invention. Softness and flexibility may be provided by numerous plasticizers, but the desired qualities of resistance and elasticity must be provided by a special type of ester as a modifying agent. The ester employed is one which is stable at high temperatures, and not subject to break-down to yield an acid. In nature the modifying ester is a well known condensation product of resin-like character, produced by reaction with heat between a polyhydric alcohol and an omega-omega dicarboxylic aliphatic acid having six or more carbon atoms in a straight chain.

The polyhydric alcohol may be one such as glycol, glycerol, trimethylene glycol, and polyglycerol. The dicarboxylic aliphatic acid may be adipic acid, pimelic acid, suberic acid, azaleic acid, sebacic acid, and higher homologs. Glycerol ester of sebacic acid is one example of such esters which gives excellent results, especially with ethyl cellulose. The modifying ester may be a mixed ester of one or more of the polyhydric alcohols with one or more of the said dicarboxylic acids. A form of ester is preferred which is dispersible in organic solvents, such as benzol or toluol, so that a solution or dispersion of the ester may be compounded with the cellulose ether, or with a solution of the cellulose ether, when it is desired to form a solution of the composition of the present invention.

Other modifying agents may be used. For example a plasticizer for softening or flexibilizing can be used, but this is not necessary because the essential modifying esters like the glycerol ester of sebacic acid have the property of softening and flexibilizing as well as the property of imparting to the modified ether elasticity and resistance to various elements. Coloring agents or fillers may be used, such as dyestuffs, pigments, metal powder, carbon black, etc. Resins for adherence and other qualities may be used. Waxes may be incorporated to limit moisture-vapor permeability.

As a special modifying agent the use of a fireproofing or fire-inhibiting agent is of value, particularly where the cellulose or other combustible substance is associated with the composition, as where the composition protects such combustible from high heat. Chlorinated diphenyl is one such agent.

The composition of a cellulose ether and an ester of a polyhydric alcohol and omega-omega dicarboxylic acid, free from volatile solvent, as in a coating composition may present a frictional surface such that it will not slip easily upon itself, for example. The composition can further be modified to give it a "slip" surface by incorporating a lubricating agent in the composition itself. Oils are suitable lubricating agents, whether of mineral, vegetable or animal origin. The non-drying oils are preferred since they are longer maintained without substantial change as the composition ages.

The composition is preferably made by incorporating the cellulose ether and the modifying ester, with the optional ingredients, with volatile solvent into a solution which is homogeneous as to the essential components, whereby upon evaporation of the solvent the cellulose ether forms a gel embodying the modifying ester in homogeneous distribution. Normally, many of the other added agents are likewise homogeneously distributed in the gel. The following examples illustrate the invention.

Example I

| Non-volatile | Parts | by weight |
|---|---|---|
| Ethyl cellulose | 80 | 59.7% |
| Glycerol ester of sebacic acid | 39 | 29.1% |
| Neat's-foot oil | 15 | 11.2% |
|  |  | 100.0% |
| Anhydrous denatured alcohol | 40 |  |
| Benzene | 272 |  |

This composition may be evaporated to form a solid mass, such as a film or coating. The neat's-foot oil is a lubricant giving surface slippage. It may also plasticize to some degree.

Example II

| Non-volatile | Parts | by weight |
|---|---|---|
| Ethyl cellulose | 57 | 50.3% |
| Glycerol ester of sebacic acid | 38.4 | 33.8% |
| Butyl acetyl ricinoleate | 6 | 5.3% |
| Neat's-foot oil | 10 | 8.8% |
| Carbon black | 2 | 1.8% |
|  |  | 100.0% |
| Volatile |  |  |
| Anhydrous denatured alcohol | 30 |  |
| Butanol | 17 |  |
| Toluene | 218.6 |  |

In this composition the butyl acetyl ricinoleate is added for action as a plasticizer in addition to the plasticizing function exerted by the glycerol ester of sebacic acid. The neat's-foot oil is a lubricant to give surface slippage. The carbon black is an inert coloring agent.

Example III

| Non-volatile | Parts | by weight |
|---|---|---|
| Ethyl cellulose | 55 | 40.7% |
| Glycerol ester of sebacic acid | 34 | 25.2% |
| Chlorinated diphenyl (liquid product) | 34 | 25.2% |
| Cocoanut oil | 12 | 8.9% |
|  |  | 100.0% |
| Volatile |  |  |
| Anhydrous ethyl alcohol | 90 |  |
| Toluol | 220 |  |

The chlorinated diphenyl is a fire-proofing agent. It may act as a plasticizer to some extent, as may the lubricating agent cocoanut oil. This composition is particularly valuable for coating cellulose as for example the cotton braid on electric conductor cable for high temperature exposure as in automobile trucks and buses. In this field, extremes of cold and heat are encountered, as well as oil, water and grease. Likewise high degrees of flexibility are required. The high tension voltage in this use creates ozone, which cannot permeate the coating, or injure it, to reach and deteriorate the underlying rubber. Absence of the fire-proofing agent still gives increased protection to the cellulose over cellulose unprotected, or protected by cellulose esters.

Example IV

| Non-volatile | Parts | by weight |
|---|---|---|
| Ethyl cellulose | 30 | 36.6% |
| Benzyl cellulose | 15 | 18.3% |
| Glycerol ester of sebacic acid | 24 | 29.3% |
| Neat's-foot oil | 8 | 9.8% |
| Butyl acetyl ricinoleate | 5 | 6.1% |
|  |  | 100.1% |
| Volatile |  |  |
| Anhydrous ethyl alcohol | 30 |  |
| Benzene | 203 |  |
| Toluene | 16 |  |

Example V

| Non-volatile | Parts | by weight |
|---|---|---|
| Methyl cellulose | 4 | 5.1% |
| Ethyl cellulose | 35 | 45.0% |
| Glycerol ester of sebacic acid | 27 | 34.6% |
| Butyl acetyl ricinoleate | 5 | 6.4% |
| Neat's-foot oil | 7 | 9.0% |
|  |  | 100.1% |
| Volatile |  |  |
| Water | 16 |  |
| Anhydrous ethyl alcohol | 35 |  |
| Butyl alcohol | 10 |  |
| Toluol | 140 |  |

In the above formula the methyl cellulose is first dispersed to a colloidal form as a sol or gel in water, and this dispersion used in compounding with the other ingredients. This does not make an excellent film for the purpose of the invention, and the example only illustrates the facts mentioned concerning methyl cellulose and mixtures of ethers.

All of the compositions above described may be subjected to temperatures as high as 400° F. or about 205° C., and higher. After exposure for hours at 400° F., a conductor cable, coated with the composition, as used in automotive vehicles can be bent about a ½ inch mandrel without breaking. Such cable can also be exposed to low temperatures like —10° F. or —23° C., with retention of the flexibility required in its normal use. The coating can remain for hours in hot oil at 200° F. (93° C.) to 300° F. (149° C.) without appreciable impairment or penetration.

In the conductor cable field the lubricating agent is of value in permitting cables to slip on each other in a conduit or where they may cross and rub.

Methyl cellulose of the character now commercially available is not suitable as the sole cellulose ether for the invention, because of its relation to water, being affected by water, and requiring some use of water to effect its dispersion in a useful composition. It is difficult later to eliminate this water from the ultimate liquid mass to be used as a coating material. However, methyl cellulose can be tolerated to a slight extent as a diluent for the other cellulose ethers here described, where these or mixtures of them predominate as the cellulose ether ingredient. The characteristic properties of the cellulose ethers begin in the aliphatic series with the ethyl homolog.

Disregarding the methyl cellulose ether, the ethyl cellulose in the above examples may be replaced by other cellulose ethers or mixtures of them. For example, the cellulose ether may comprise equal parts of ethyl cellulose and benzyl cellulose, or three parts of ethyl cellulose and one part benzyl cellulose. The better results are obtained with all or a higher proportion of the aliphatic cellulose ethers, and the best results for both high and low temperatures are obtained with ethyl cellulose alone as the cellulose ether, when glycerol ester of sebacic acid is also employed.

The essential combination of cellulose ether as a base material, and a modifying ester of polyhydric alcohol and omega-omega dicarboxylic aliphatic acid having at least a six-carbon straight chain may be variously compounded, modified and used without departing from the invention as set forth in the appended claims.

We claim:

1. The method of protecting cellulose and like organic combustible matter particularly against thermal decomposition which comprises covering the same with a cellulose ether base composition containing ethyl cellulose as an essential ingredient and as a modifying agent an ester of a polyhydric alcohol and an omega-omega dicarboxylic aliphatic acid having at least a six-carbon straight chain, said ethyl cellulose and said modifying agent being present in amounts to produce a flexible composition which is relatively stable at temperatures which cause rapid deterioration of cellulose acetate and cellulose nitrate.

2. The method of protecting cellulose and like organic combustible matter particularly against thermal decomposition which comprises covering the same with a cellulose ether base composition containing ethyl cellulose as an essential ingredient and as a modifying agent an ester of a polyhydric alcohol and an omega-omega dicarboxylic aliphatic acid having at least a six-carbon straight chain, and containing also a fireproofing agent, said ethyl cellulose and said modifying agent being present in amounts to produce a flexible composition which is relatively stable at temperatures which cause rapid deterioration of cellulose acetate and cellulose nitrate.

3. A flexible composition of matter comprising the combination of cellulose ether as a base material containing ethyl cellulose as an essential ingredient, a modifying agent consisting of an ester of a polyhydric alcohol and an omega-omega dicarboxylic aliphatic acid having at least a six-carbon straight chain, said ethyl cellulose and said modifying agent being present in amounts to produce a composition which is relatively stable at temperatures which cause rapid deterioration of cellulose acetate and cellulose nitrate, and a lubricating agent to facilitate surface slippage of the composition.

4. A flexible composition of matter comprising the combination of cellulose ether as a base material containing ethyl cellulose as an essential ingredient, a modifying agent consisting of an ester of a polyhydric alcohol and an omega-omega dicarboxylic aliphatic acid having at least a six-carbon straight chain, said ethyl cellulose and said modifying agent being present in amounts to produce a composition which is relatively stable at temperatures which cause rapid deterioration of cellulose acetate and cellulose nitrate, and a fire-proofing agent.

5. A flexible composition of matter comprising the combination of a cellulose ether as a base material containing ethyl cellulose as an essential ingredient, and as a modifying agent a glycerol ester of an omega-omega dicarboxylic aliphatic acid having at least a six-carbon chain, said ethyl cellulose and said modifying agent being present in amounts to produce a relatively stable composition at temperatures which cause rapid deterioration of cellulose acetate and cellulose nitrate.

6. A flexible composition of matter comprising the combination of cellulose ether as a base material containing ethyl cellulose as an essential ingredient, and as a modifying agent a glycol ester of an omega-omega dicarboxylic aliphatic acid having at least a six-carbon straight chain, said ethyl cellulose and said modifying agent being present in amounts to produce a relatively stable composition at temperatures which cause rapid deterioration of cellulose acetate and cellulose nitrate.

7. A flexible composition of matter comprising the combination of ethyl cellulose as a base material and as a modifying agent a glycerol ester of an omega-omega dicarboxylic aliphatic acid having at least a six-carbon straight chain, said two ingredients being present in amounts sufficient to produce a relatively stable composition at temperatures which cause rapid deterioration of cellulose acetate and cellulose nitrate.

8. A flexible composition of matter comprising the combination of ethyl cellulose as a base material and as a modifying agent a glycerol ester of sebacic acid, said two ingredients being present in amounts sufficient to produce a relatively stable composition at temperatures which cause rapid deterioration of cellulose acetate and cellulose nitrate.

9. A flexible composition of matter comprising the combination of cellulose ether as a base material containing ethyl cellulose as an essential ingredient, and as a modifying agent an ester of a polyhydric alcohol and sebacic acid, said ethyl cellulose and said modifying agent being present in amounts sufficient to produce a composition which is relatively stable at temperatures which cause rapid deterioration of cellulose acetate and cellulose nitrate.

10. A flexible composition of matter comprising the combination of ethyl cellulose as a base material and as a modifying agent the glycol ester of sebacic acid in amounts sufficient to produce a composition relatively stable at 175° C.

11. A cellulosic material having a coating thereon capable of rendering the cellulose material more resistant to thermal decomposition by heat from the direction of the coating, said coating comprising a cellulose ether as a base material containing ethyl cellulose as an essential ingredient, and as a modifying agent an ester of a polyhydric alcohol and an omega-omega dicarboxylic aliphatic acid having at least a six-carbon straight chain.

12. A flexible composition of matter for protecting cellulosic materials having the special property of protecting the same from the effect of heat, comprising the combination of ethyl cellulose as a first base material and an ester of a polyhydric alcohol and an omega-omega dicarboxylic aliphatic acid having at least a six-carbon straight chain as a second base material, said two ingredients being present in amounts sufficient to produce a composition which is relatively stable at 175° C.

ELMER W. TROLANDER.
WILLIAM COURTNEY WILSON.